(No Model.)
W. E. LOWRIE.
Rotary Check Rower.
No. 239,051.  Patented March 22, 1881.
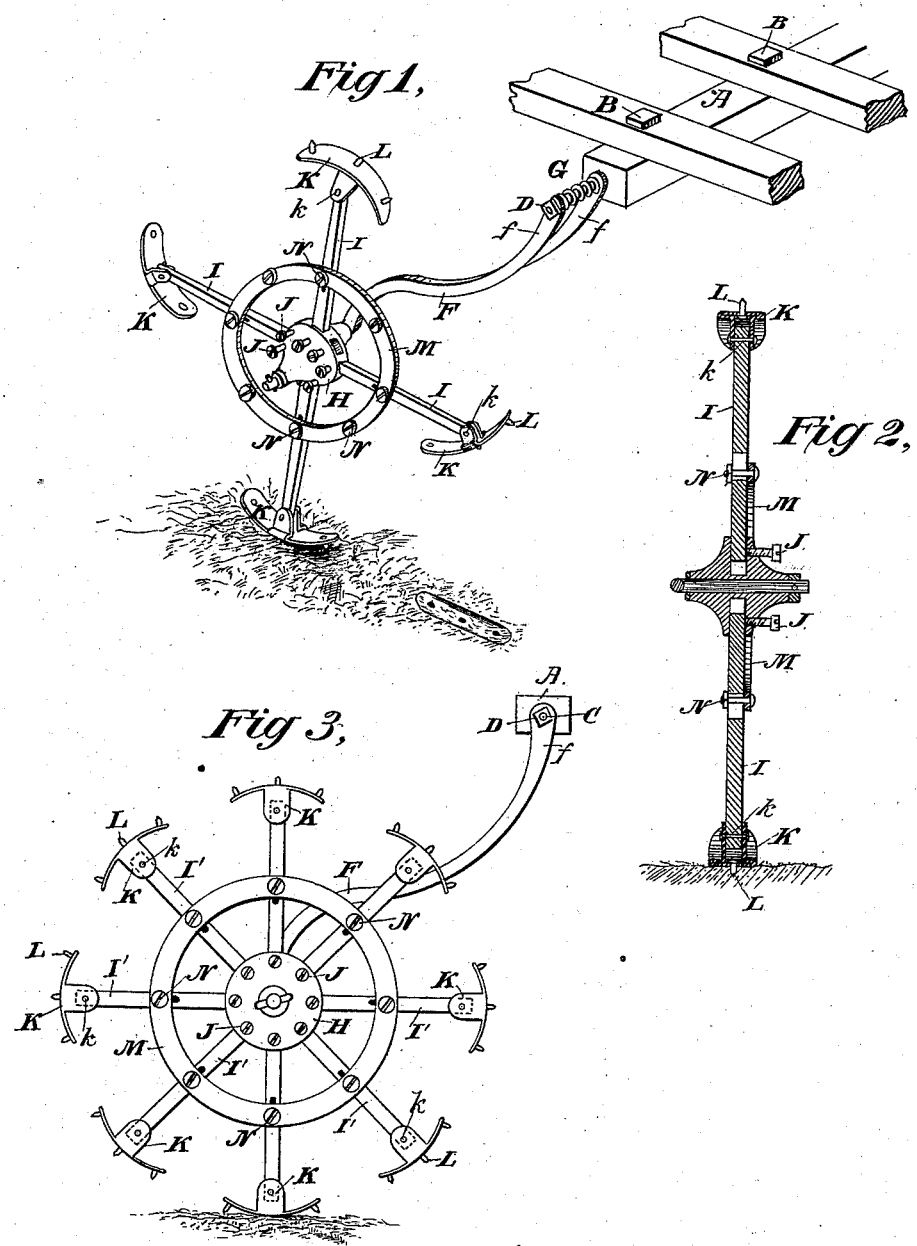
Attest:
Geo. T. Smallwood Jr.
N. E. Knight
Inventor:
William E. Lowrie
By Knight Bros
Attys.

UNITED STATES PATENT OFFICE.

WILLIAM E. LOWRIE, OF CLEARPORT, OHIO.

ROTARY CHECK-ROWER.

SPECIFICATION forming part of Letters Patent No. 239,051, dated March 22, 1881.

Application filed September 21, 1880. (No model.)

*To all whom it may concern:*

Be it known that I, WILLIAM E. LOWRIE, of Clearport, in the county of Fairfield and State of Ohio, have invented new and useful Improvements in Rotary Check-Rowers, of which the following is a specification.

The machine is constructed with any desirable number of spokes attached to a hub in which they are adjustable radially, and having pivoted to their extremities toothed shoes adapted to make impressions as they come successively to the ground. The hub is mounted after the manner of a wheel in a journal formed on the rear end of an arm, the forward extremity of which is forked and journaled on a bar, by which the attachment may be bolted on a two-horse planter of any ordinary construction.

In order that my invention may be fully understood, I will proceed to describe it with reference to the accompanying drawings, in which—

Figure 1 is a perspective view, showing the marker attached to the planter. Fig. 2 is a longitudinal section through the hub. Fig. 3 is a side view, illustrating the mode of introducing a larger number of short arms for the purpose of drilling corn from six to twelve inches, or at any desired distance, apart.

A represents a bar, which may be secured to the frame of a common corn-planter by means of bolts B B, as shown in Fig. 1. On the extremity of this bar is a stud, C, threaded at its end to receive a nut, D, which secures thereon the bifurcated end *f* of the marker-arm F, a strong coiled spring, G, being introduced between the forks *f*, so that when the nut D is turned on the arm may be held firmly home to its work, while permitted to rise and fall to allow the marker to accommodate itself to irregularities in the ground. The marker is formed of the hub H and any desirable number of spokes I, fixed therein by set-screws J, so as to be radially adjustable.

On the extremities of the arms I shoes K are attached by pivots *k*, to permit them to turn in stopping on the ground approximately after the manner of a human foot. The soles of the shoes are convex, and are provided with three, more or less, projecting points or teeth L L to prevent slipping on the ground.

M represents a brace-ring, by means of which the spokes are fixed in equidistant positions by means of set-screws N.

It will be apparent that the radial adjustment of the spokes adapts them to mark the ground at greater or less distances, as may be desired.

In Fig. 3, I′ I′ I′ represent a larger number of shorter spokes attached to the hub in similar manner, and adapted to mark the ground at shorter distances apart. By this means I am enabled to plant the corn in drills with the seed accurately spaced at six, eight, or ten inches, as may be desired.

It will be apparent that my machine dispenses entirely with furrowing or marking out the corn-ground before planting. Every step of the rotary check-wheel indicates exactly where every hill is to be discharged, so that the corn may be planted in rows both ways. The only care necessary is to have the distance properly determined by the radial adjustment of the spokes, and then to have the first step correctly started, after which the work will be correctly carried on completely across the field.

It is preferred to make the shoes of cast-iron with the forward ends weighted so as to adapt them to step flat on the ground. The hub is also of cast-iron and the spokes of wrought-iron, adapted for ready removal when required by loosening the set-screws J and N.

Having thus described my invention, the following is what I claim as new therein and desire to secure by Letters Patent:

1. The gravitating horizontal or inclined arm F, having bifurcated end *f*, and the spring G, in combination with a check-row marker consisting of a wheel of spokes, as and for the purpose set forth.

2. The marker-wheel constructed with spokes I, and shoes K pivoted to their extremities, so as to turn while in contact with the ground.

3. The combination of hub H, radially-adjustable spokes I, and shoes K, as and for the purpose set forth.

WILLIAM E. LOWRIE.

Witnesses:
JOHN ABBOTT,
ISAAC HENNIS.